United States Patent [19]

Kitaura et al.

[11] Patent Number: 4,654,590

[45] Date of Patent: Mar. 31, 1987

[54] METHOD AND APPARATUS FOR DETECTING THE POSITION OF A MOVABLE OBJECT UTILIZING THE MAGNETOSTRICTIVE EFFECT TO GENERATE ULTRASONIC WAVES

[75] Inventors: Wataru Kitaura; Tetsuo Ito, both of Hitachi, Japan

[73] Assignee: Hitachi, Ltd., Tokyo, Japan

[21] Appl. No.: 658,368

[22] Filed: Oct. 5, 1984

[30] Foreign Application Priority Data

Oct. 5, 1983 [JP] Japan .................................. 58-185061

[51] Int. Cl.⁴ .......................... G01B 7/14; G01S 15/00
[52] U.S. Cl. ................................... 324/208; 33/125 W
[58] Field of Search ............ 324/207, 208; 33/125 W; 73/597; 367/127, 128

[56] References Cited

U.S. PATENT DOCUMENTS

| | | | |
|---|---|---|---|
| 3,898,555 | 8/1975 | Tellerman | 324/208 |
| 4,144,519 | 3/1979 | Chamuel | 324/208 X |
| 4,238,844 | 12/1980 | Ueda et al. | 324/208 X |
| 4,404,523 | 9/1983 | Hughes et al. | 324/207 |

*Primary Examiner*—Gerard R. Strecker
*Attorney, Agent, or Firm*—Antonelli, Terry & Wands

[57] ABSTRACT

A plurality of permanent magnets are disposed on a movable object with predetermined spacings between them, and a fixed permanent magnet or magnets are disposed at positions spaced apart by a predetermined distance from the detection portion of a waveguide disposed along the movable object. Magnetostrictive ultrasonic waves generated on the waveguide are detected at the positions of these permanent magnets, and the position of the movable object is detected from the number of ultrasonic wave signals and the propagation time.

5 Claims, 11 Drawing Figures

(1) PULSE SIGNALS (2) DETECTED SIGNAL (3) OUTPUT OF FLIP-FLOP (4) DC OUTPUT

METHOD AND APPARATUS FOR DETECTING THE POSITION OF A MOVABLE OBJECT UTILIZING THE MAGNETOSTRICTIVE EFFECT TO GENERATE ULTRASONIC WAVES

BACKGROUND OF THE INVENTION

This invention relates to a position detector utilizing a magnetostrictive effect, and more particularly to a position detector for detecting the position of an elongated movable object which provides high detection accuracy even in the atmosphere in which a temperature change occurs.

In a prior position detector, a core wire is disposed inside a waveguide made of a ferromagnetic material and the movable object is provided with a permanent magnet at a predetermined position thereof. When a pulse current is applied from a pulse generator to the core wire, ultrasonic wave is generated by a magnetostrictive effect at the location where the permanent magnet of the movable object exists, and propagates through the waveguide.

If the permanent magnet exists at a position having a distance x from some point on the waveguide, a voltage can be detected in a coil at the time t (sec) after the application of the pulse current by the inverse magnetostrictive effect. The position x can be determined in accordance with the formula below by measuring this time t:

$$x = v \cdot t$$

where v is the propagation speed of the ultrasonic wave inside the waveguide.

In conventional position detectors of the kind described above, the propagation time t of the ultrasonic wave is measured in accordance with the formula above. Therefore, if the propagation speed v changes for some reason or other, the time t also changes. Thus, the change of v directly turns out to be the detection error.

SUMMARY OF THE INVENTION

The present invention is therefore directed to provide a high precision position detector having a limited detection error due to a temperature change.

The present invention is characterized in that a plurality of permanent magnets are disposed on a movable object with predetermined spacings between them, fixed permanent magnets are disposed at positions spaced apart by a predetermined distance from the detecting portion of a waveguide, the magnetostrictive ultrasonic waves occurring in the waveguide are detected at the positions of these magnets, and the position of the movable object is detected from both the number of ultrasonic signals and propagation time.

DESCRIPTION OF THE PREFERRED EMBODIMENT

Figure 1:
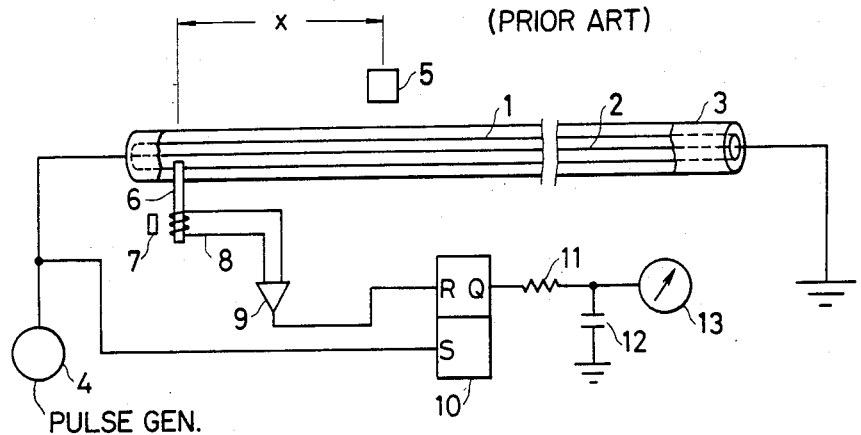
FIG. 1 shows a position detector of the prior art.
Figure 2:
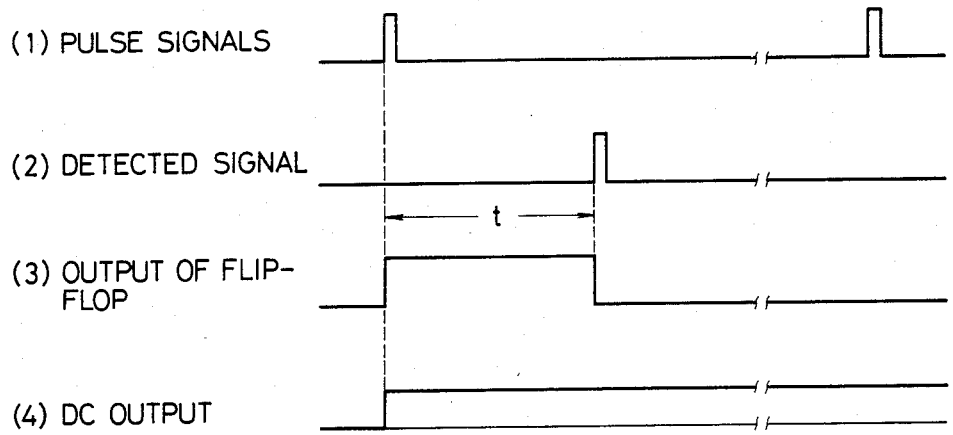
FIG. 2 shows the principle of the operation.
Figure 3:
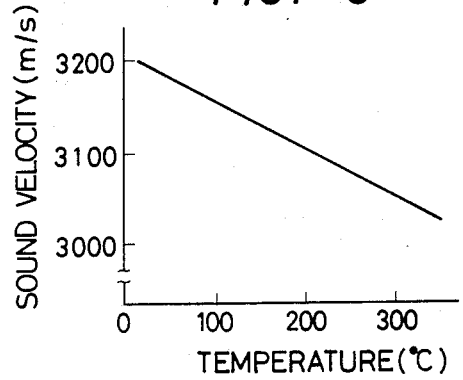
FIG. 3 shows the temperature dependence of the propagation speed of ultrasonic wave.

Referring initially to FIGS. 1 through 3, the prior art technique described earlier will be explained in detail.

In FIG. 1, a core wire 2 is shown disposed inside a waveguide 1 made of a ferromagnetic material such as a Ni-Fe alloy or the like. When a pulse current is applied from a pulse generator 4 to the core wire 2, an ultrasonic wave is generated in the waveguide 1 by the magnetostrictive effect at a position where permanent magnet 5 disposed on a movable object exists. A protective pipe 3 is disposed lest the waveguide comes into contact with external objects and the ultrasonic wave is damped. The resulting ultrasonic wave reaches a guide 6 which contacts the waveguide and serves for guiding the propagated ultrasonic wave to a detecting position as described hereafter. A coil 8 is wound on the guide 6, and a permanent magnet 7 is disposed in the proximity of the coil 8. Therefore, when the ultrasonic wave arrives at the guide 6 passing through the inside of the coil 8 which exists in the magnetic field generated by the permanent magnet 7, a voltage is induced in the coil 8 by the inverse magnetostrictive effect, so that the generated and propagated ultrasonic wave is detected.

If the permanent magnet 5 exists at a position having a distance x from the guide 6, the voltage can be detected in the coil 8 at the time t (sec) after the application of the pulse current, as shown in FIG. 2(2). The position x can be determined by the following formula by measuring this time t:

$$x = v \cdot t \tag{1}$$

where v is the propagation speed of the ultrasonic wave inside the waveguide 1.

More particularly, a flip-flop 10 is set simultaneously with the application of the pulse current as shown in FIG. 2(1), and is reset when the coil 8 detects the ultrasonic wave. For this reason, the output of the flip-flop 10 becomes "1" only for the time t which is proportional to the position x as shown in FIG. 2(3). A d.c. output proportional to x appears in an indicator 13 after the output is smoothed by a resistor 11 and a capacitor 12.

In the conventional position detector of this kind, the propagation time t of the ultrasonic wave in the formula (1) is measured, so that t will change if the propagation speed v changes for some reason or other, and the change of v results directly in an error in the detection of x.

FIG. 3 shows the temperature dependence of the propagation speed of the ultrasonic wave inside a nickel steel. It has a temperature dependence of approximately $1.5 \times 10^{-2}\%/°C.$, and a detection error of about 4.5% appears if the ambient temperature changes by 300° C. When this position detector is used as a position detector for detecting the control rod of a nuclear reactor, for example, there is the possibility that a detection error of about 83 mm occurs.

Hereinafter, one embodiment of the present invention will be described in detail with reference to FIGS. 4–6.

Figure 4:
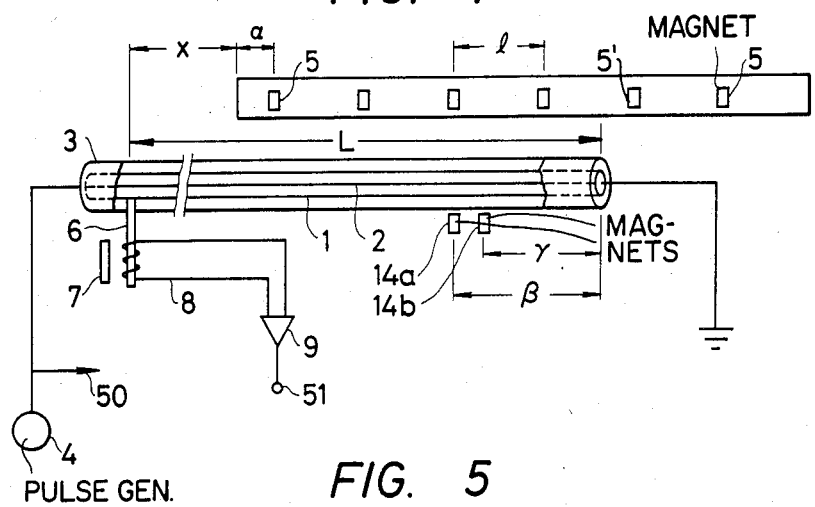
FIG. 4 shows the construction of the present invention.

FIG. 4 illustrates a position detector of the present invention. In the drawing, like reference numerals are used to identify like constituents as in FIG. 1. FIG. 5 shows a circuit diagram of the position detector of the present invention.

The differences of the position detector shown in FIG. 4 from the prior art detector shown in FIG. 1 are that a plurality of permanent magnets 5 (hereinafter called "movable permanent magnets 5") are disposed on the movable object 5' with a predetermined spacing 1 between adjacent permanent magnets 5. Further, the magnet 5 at the left end of the movable object 5' is disposed at a position spaced apart by a distance $\alpha$ from a reference point of the movable object which in a reference position is aligned with the guide 6. Additionally, two permanent magnets 14a and 14b (hereinafter called "fixed permanent magnets 14") are disposed at positions spaced apart by different distances $\beta$ and $\gamma$ from the right end of the waveguide 1 opposite to the guide 6.

Figure 6:
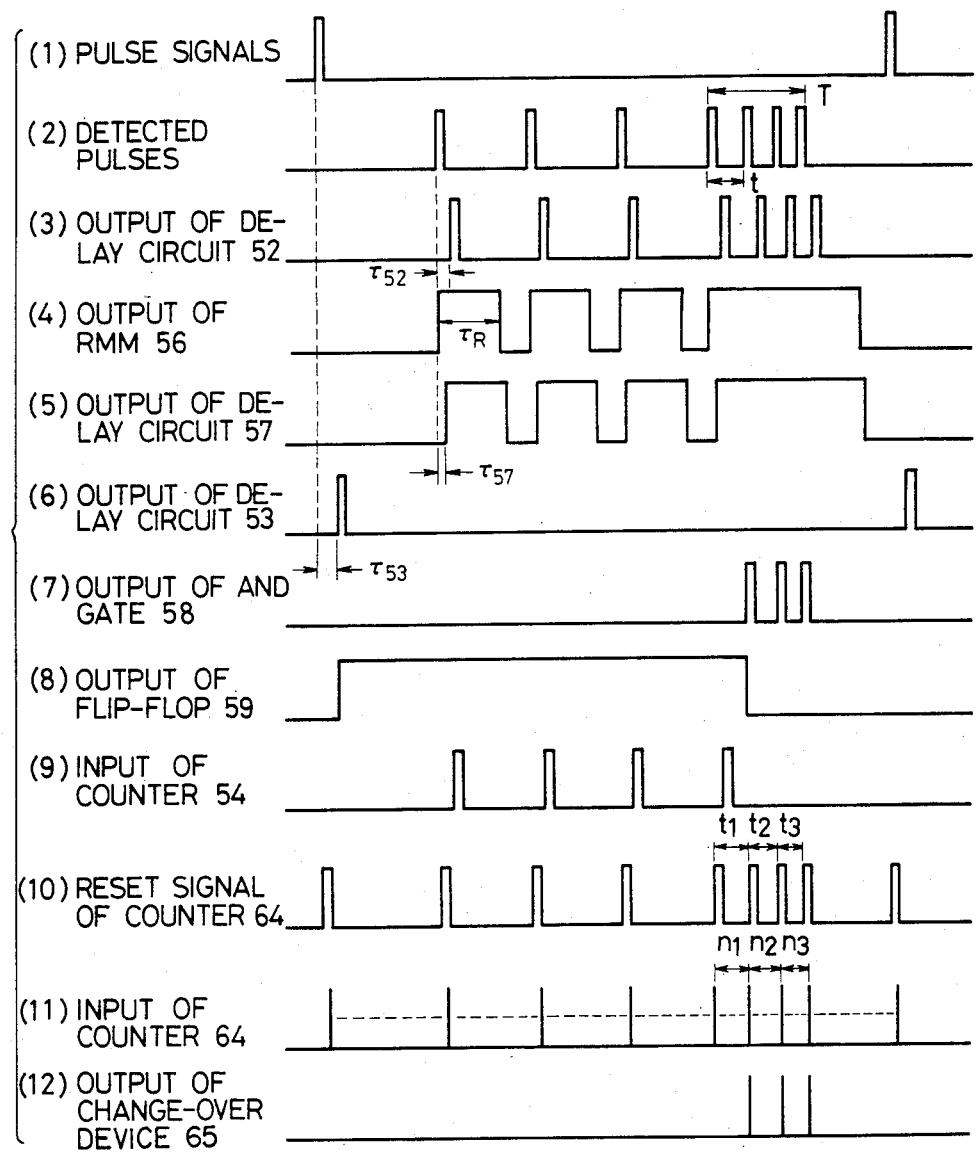
FIG. 6 shows the principle of operation of the circuit.

When a pulse current such as shown in FIG. 6(1) is applied from the pulse generator 4 to the core wire 2, magnetostrictive ultrasonic waves are generated at respective positions of the waveguide 1, at which the movable permanent magnets 5 and the fixed permanent magnets 14a and 14b apply magnetic fields to the waveguide. These ultrasonic waves propagate through the waveguide 1, reach the guide 6 and induce voltages in the coil 8. The voltages are then subjected to wave shaping and are amplified, providing pulse signals as shown in FIG. 6(2) from a terminal 51.

Figure 5:
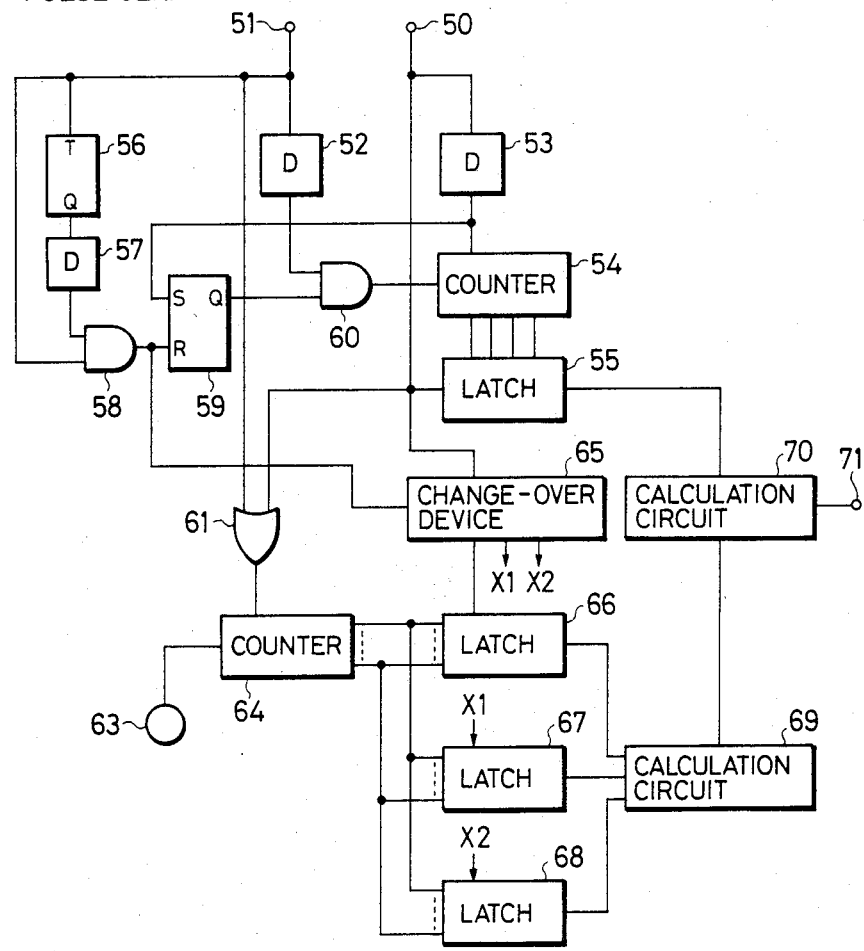
FIG. 5 shows a circuit diagram of one embodiment of the invention.

A signal is applied from a terminal 50 to a latch 55 shown in FIG. 5 simultaneously with the application of the pulse current to the core wire 2, and the content of a counter 54 is latched by the latch 55. The counter 54 is reset by a pulse passing through a delay circuit 53, as shown in FIG. 6(6), which sets a delay time $\tau_{53}$ that is longer than the time required for the latch operation. If this delay circuit 53 does not exist, the latching operation of the content of the counter 54 by the latch 55 starts simultaneously with the resetting operation of the counter 54, so that the latching operation of the content of the counter 54 into the latch 55 can not be carried out normally.

The detected pulses appearing at terminal 51 as shown in FIG. 6(2) trigger a retriggerable mono-multi vibrator 56 (hereinafter called "R.M.M.") and this output Q becomes such as shown in FIG. 6(4). Here, the set time $\tau_R$ of R.M.M. is smaller than the propagation time required for the ultrasonic wave to transfer between the adjacent movable permanent magnets. Since R.M.M. 56 operates at the leading edge of the detected pulse shown in FIG. 6(2), a flip-flop 59 would be reset simultaneously with the application of the first detected pulse to the terminal 51. However, a delay circuit 57 having a delay time $\tau_{57}$ as shown in FIG. 6(5) which is greater than the time width of the detected pulse is disposed at the output of R.M.M. 56 to prevent such simultaneous resetting. The circuit shown in FIG. 5 is directed to count the detected pulses appearing at terminal 51 until the period or interval between the detected pulses becomes different as shown in FIG. 6(2), and the flip-flop 59 is reset at the timing at which the pulses having a different period is detected as shown in FIG. 6(8). The different period pulses are caused by pulses corresponding to ultrasonic waves generated by the fixed magnets 14a and 14b. Therefore, the pulse is applied to an AND gate 58 through the delay circuit 57. In other words, one of the inputs to the AND gate 58 becomes such as shown in FIG. 6(5). The output signal of the AND gate 58 becomes such as shown in FIG. 6(7), and the flip-flop 59 is reset at the first pulse.

The counter 54 counts the detected pulses that are applied to an AND gate 60 through the delay circuit 52 during the period in which the flip-flop 59 is kept set. Here, the delay circuit 52 is disposed to delay the detected pulses by only a limited time $\tau_{52}$ so as not to count the pulse that resets the flip-flop 59.

On the other hand, a counter 64 is reset by the pulse current appearing at terminal 50 or the detected pulses appearing at terminal 51 as shown in FIG. 6(10). An oscillator 63 is connected to the counter 64 and always effects counting as shown in FIG. 6(11). A change-over device 65 sequentially produces signals to the latches 66, 67, and 68 by means of the output signal of the AND gate 58 (FIG. 6(12), and the content of the counter is sequentially stored in the latches 66, 67 and 68. In other words, the number of pulses $n_1$, $n_2$ and $n_3$ corresponding to the pulse intervals $t_1$, $t_2$ and $t_3$ are stored in the latches.

Thereafter, a calculation circuit 69 performs the following processing. First, $n_1$, $n_2$ and $n_3$ are added, and the pulse number N corresponding to the pulse interval T is determined. Next, a division $n_1/N$ is effected to determine the relation of position between the fixed permanent magnets 14 and the movable permanent magnets 5. Next, another calculation circuit 70 performs the following calculation using the result of the calculation circuit 69, the content of the latch 55 and the set conditions 1, $\alpha$, $\beta$ of the magnets:

$$x = L - \left(i - 1 + \frac{t}{T}\right) l - \alpha - \beta \qquad (2)$$

where L is the length of the waveguide, between the guide 6 and the right end of the waveguide and i is the content of the latch 55.

This value x represents the moving distance of a movable object 5' with the guide 6 shown in FIG. 4 being the reference point.

Figure 7:
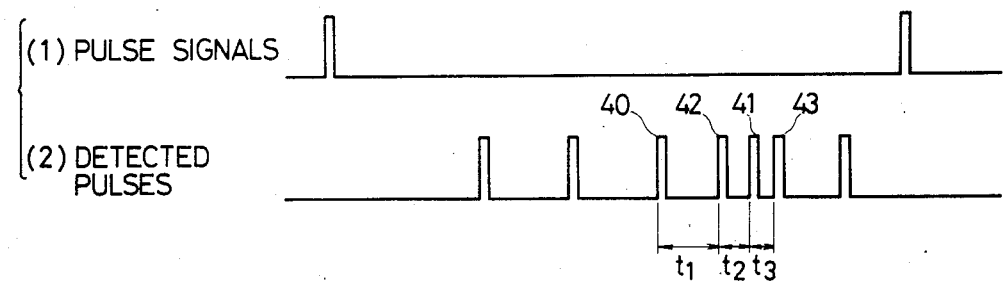
FIGS. 7 through 9 show examples of detected pulses depending upon magnet positions.

The above explains the operation when the fixed permanent magnets 14a and 14b are disposed between adjacent movable magnets 5. However, when a movable permanent magnet 5 is interposed between the fixed permanent magnets, 14a and 14b the ultrasonic wave is detected as shown in FIG. 7(2). That is, the ultrasonic wave 41 generated by a movable permanent magnet 5 in response to a pulse current as shown in FIG. 7(1) is detected between the ultrasonic waves 42 and 43 generated by the fixed permanent magnets 14a and 14b. Here, the contents $n_1$, $n_2$ and $n_3$ taken into the latches 66, 67 and 68 are values that correspond to the time $t_1$, $t_2$ and $t_3$ shown in FIG. 7(2). The value $t_1$ in FIG. 7(2) is reliably greater than the value $t_1$ shown in FIG. 6(10). When the content $n_1$ of the latch 66 corresponding to $t_1$ exceeds a predetermined value m as described below, the change-over device 65 is prevented from producing the latch signal to the latch 68, and the latch 68 is cleared. Therefore, the content $n_3$ of the latch 68 in this case becomes zero, and thereafter the position is detected in the same way as described above. Here, the value m is set to a value $n_1$ which is taken into the latch 66 when the position of the fixed permanent magnet 14b close to the end of the waveguide overlaps with the position of one of the movable permanent magnets 5. Therefore, no problem occurs even when the fixed permanent magnet 14b overlaps with the movable permanent magnet.

Figure 8:
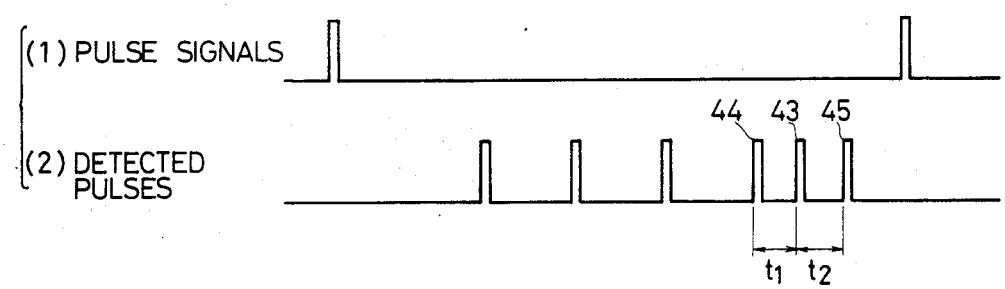

As the third case, there is a case where the fixed permanent magnet 14a overlaps with one of the movable permanent magnets 5. The detected pulses in this case are shown in FIG. 8(2) because the ultrasonic wave by the fixed permanent magnet 14a overlaps with the ultrasonic wave by one of the movable permanent magnets 5 and is represented by a single detected pulse 44. Therefore, the values $n_1$ and $n_2$ corresponding to $t_1$ and $t_2$ shown in FIG. 8(2) are taken into the latches 66 and 67, but $n_3$ is zero because the latch 68 does not operate. The $t_1$ value in this case is equal to $t_2$ shown in FIG. 6(10). Therefore, if the magnets are disposed in such a manner as to satisfy the relation $t_1 < t_2$, the relation of the position of the magnets can be discriminated by checking the condition $t_1 < t_2$. In this instance, the position can be detected by reducing the spacing $(\beta - \gamma)$ between the fixed permanent magnets from the value obtained by equation (2).

The description given above deals with the case where two fixed permanent magnets are disposed, but the number of the fixed permanent magnets may be one. The detected signal in this case becomes such as shown in FIG. 8(2), and only $t_1$ and $t_2$ are measured whereby the latch 68 shown in FIG. 5 becomes unnecessary. If a device for monitoring the data on the measured position is disposed in order to cope with the overlap of the magnets, the position detector becomes possible.

Furthermore, the movable permanent magnets may be disposed in such a manner as to satisfy the following relation between the period $T_p$ of the pulse current and the ultrasonic pulse interval T by the movable permanent magnets:

$$T_p = nT + T_\alpha \quad (3)$$

where n is the number of the movable permanent magnets, and $T_\alpha$ is the time required for the ultrasonic wave to propagate over the distance $\alpha$ as shown in FIG. 4.

Figure 9:
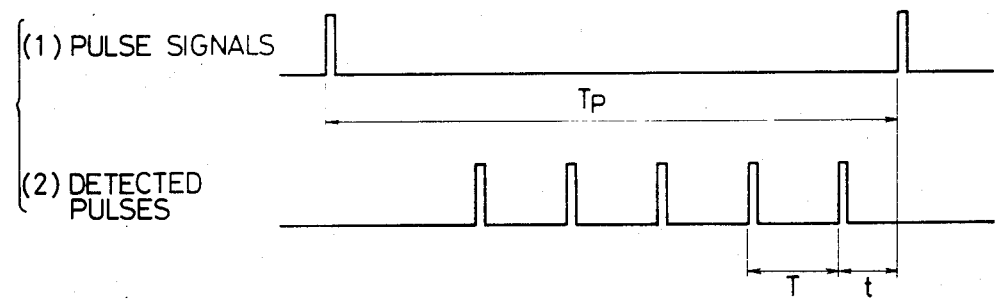

In this case, a signal such as shown in FIG. 9(2) is detected when the movable object moves. The value t changes between O and T. The position can be detected by merely measuring the time t if the pulse interval T is set before the time t as shown in FIG. 9(2) or is known in advance from the set spacing between the movable permanent magnets.

Figure 11:
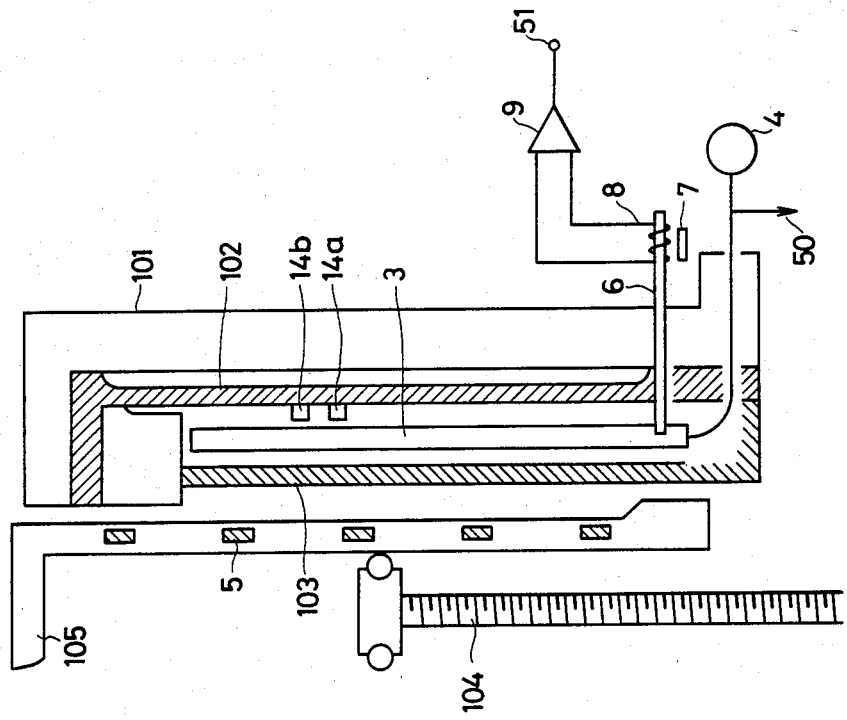
FIG. 11 shows an application example of the invention.
Figure 10:
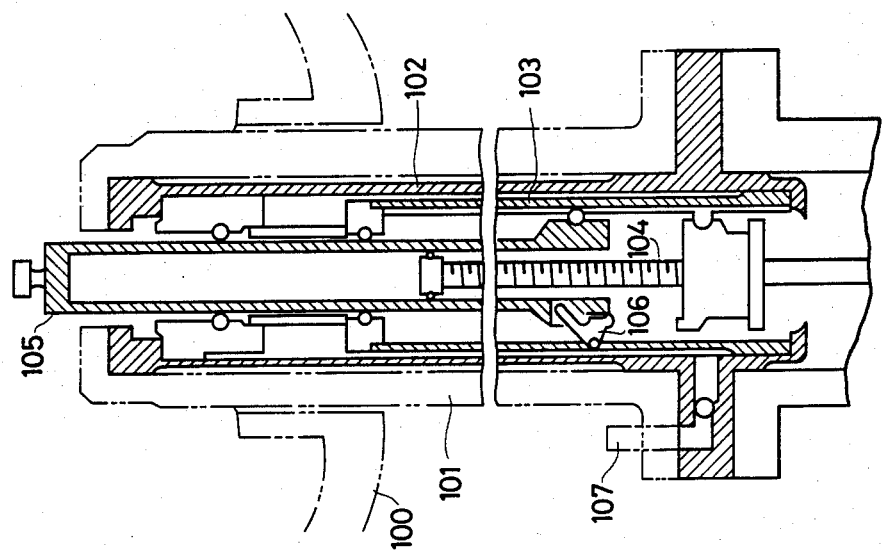
FIG. 10 shows a driving mechanism of a reactor control rod.

An example of application of the position detector in accordance with the present invention to a position detector for the control rod of a nuclear reactor will be explained with reference to FIGS. 10 and 11. The control rod is connected to a hollow piston 105, and is operated by the rotation of a ball screw 104 when the system operates. It is disengaged from the latch 106 at the time of scrum, and is operated by the pressure of the water entering from a scram piping arrangement 107. FIG. 11 shows the fitting position of the position detector of the present invention, where it is shown disposed between an outer tube 102 and a guide tube 103. The fixed permanent magnet 14 is fixed to the outer tube, while the movable permanent magnets 5 are fitted to the hollow piston 105, so that the position of the hollow piston 105, that is, the position of the control rod, can be detected by the operation described above.

The detection error when the full stroke of the control rod is 3,660 mm and the number of the movable permanent magnets is 10, is about 1.6 mm provided that the ambient temperature changes by 300° C., and this value is about 1/50 of the conventional value.

As described above, the position detector of the present invention is of the system which counts digitally the number of pulses, and determines the position from the ratio t/T of the ultrasonic wave propagation time t between the movable permanent magnet 5 and the fixed permanent magnet 5, shown in FIG. 6(2), to the ultrasonic wave propagation time T between the adjacent movable permanent magnets 14. Therefore, the detection error due to the change of the ambient temperature around the waveguide is small, and the position can be detected highly accurately.

What is claimed is:

1. A method for detecting the position of an elongated movable object arranged for movement with respect to an elongated waveguide having a core wire disposed therein and extending along the moving direction of the movable object, first magnetic field generation means including a plurality of first magnetic field generators arranged in the moving direction of the movable object with a predetermined spacing between adjacent first magnetic field generators for applying a magnetic field to the waveguide at respective positions of the waveguide in accordance with the movement of the movable object, and second magnetic field generation means including at least one second magnetic field generator disposed so as to apply a magnetic field at a fixed position of the waveguide, the method comprising the steps of:

applying a pulse current to the core wire of the waveguide to generate ultrasonic waves by a magnetostrictive effect at positions of the waveguide where the magnetic field is applied to the waveguide by the first and second magnetic field generating means and propagating the generated ultrasonic waves along the waveguide;

receiving the propagated ultrasonic waves at a predetermined position of the waveguide; and detecting the position of the movable object by processing signals indicative of the received ultrasonic waves, the processing including;

counting the number of received signals which are caused by the first magnetic field generation means, obtaining a time relationship of a signal caused by the second magnetic field generation means to the signals caused by the first magnetic field generation means, and calculating the distance of the movable object with respect to the predetermined position of the waveguide on the basis of the number of counted signals and the obtained time relationship.

2. An apparatus for detecting the position of an elongated movable object comprising:

an elongated waveguide arranged proximate to the movable object and extending in the moving direction thereof, the waveguide being provided with a core wire extending in the direction of movement of the movable object;

means for applying a pulse current to the core wire;

first magnetic field generation means including a plurality of first magnetic field generators disposed on the movable object, said first magnetic field generators applying a magnetic field to the waveguide at respective positions in accordance with the movement of the movable object, whereby in response to a pulse current applied to the core wire, ultrasonic waves are generated by a magnetostrictive effect at the positions of the waveguide where the magnetic fields are applied and propagated along the waveguide;

second magnetic field generation means including at least one second magnetic field generator for applying a magnetic field to a fixed portion of the waveguide, whereby in response to a pulse current applied to the core wire an ultrasonic wave is generated by the magnetostrictive effect at the fixed position of the waveguide and propagated along the waveguide;

sensing means being disposed at a predetermined position of the waveguide for receiving the generated and propagated ultrasonic waves and for producing pulse signals in response thereto;

means for counting the number of pulse signals caused by the first magnetic field generation means;

means for obtaining a time relationship of a pulse signal caused by the second magnetic field generation means to the pulse signals caused by the first magnetic field generation means; and means for calculating the distance of the movable object with respect to the predetermined position of the waveguide on the basis of the number of counted pulse signals and the obtained time relationship.

3. An apparatus according to claim 2, wherein the plurality of first magnetic field generators are disposed on the movable object with a predetermined spacing between adjacent first magnetic field generators.

4. An apparatus according to claim 3, wherein the first and second magnetic field generators comprise permanent magnets.

5. A position detector according to claim 3, wherein the sensing means is disposed proximate to one end of the waveguide and the at least one second magnetic generator is disposed proximate to the other end of the waveguide at a position spaced from the other end of the waveguide by a distance greater than the predetermined spacing between adjacent first magnetic field generators.

* * * * *